(12) United States Patent
Eriksson et al.

(10) Patent No.: US 11,423,901 B2
(45) Date of Patent: *Aug. 23, 2022

(54) DIALOG MANAGEMENT SYSTEM FOR USING MULTIPLE ARTIFICIAL INTELLIGENCE SERVICE PROVIDERS

(71) Applicant: Accenture Global Solutions Limited, Dublin (IE)

(72) Inventors: Laetitia Cailleteau Eriksson, London (GB); Christopher Wickes, Macclesfield (GB); Marion Danielle Claude Perichaud Duncan, London (GB); Augusto Gugliotta, London (GB)

(73) Assignee: Accenture Global Solutions Limited, Dublin (IE)

( * ) Notice: Subject to any disclaimer, the term of this patent is extended or adjusted under 35 U.S.C. 154(b) by 142 days.

This patent is subject to a terminal disclaimer.

(21) Appl. No.: 16/929,898

(22) Filed: Jul. 15, 2020

(65) Prior Publication Data

US 2020/0349944 A1 Nov. 5, 2020

Related U.S. Application Data

(63) Continuation of application No. 16/453,428, filed on Jun. 26, 2019, now Pat. No. 10,847,157, which is a
(Continued)

(51) Int. Cl.
*G10L 15/20* (2006.01)
*G10L 15/22* (2006.01)
(Continued)

(52) U.S. Cl.
CPC .......... *G10L 15/22* (2013.01); *G06F 16/3329* (2019.01); *G06F 16/3334* (2019.01); *G06N 5/02* (2013.01); *G10L 2015/225* (2013.01)

(58) Field of Classification Search
None
See application file for complete search history.

(56) References Cited

U.S. PATENT DOCUMENTS 9,042,540 B2 5/2015 Tuchman et al.
10,276,170 B2 * 4/2019 Gruber .................... G10L 15/22
(Continued)

FOREIGN PATENT DOCUMENTS

KR 101891498 9/2018
WO WO 2018170876 9/2018

OTHER PUBLICATIONS

Extended European Search Report in European Appln. No. 19210834.8, dated Apr. 6, 2020, 9 pages.
(Continued)

*Primary Examiner* — Seong-Ah A Shin
(74) *Attorney, Agent, or Firm* — Fish & Richardson P.C.

(57) ABSTRACT

Implementations of the present disclosure include methods, systems, and computer-readable storage mediums for utilizing multiple AI service providers by a dialog management system. The dialog management system can include a dispatcher bot, multiple worker bots, and multiple AI adapters that are each associated with a different cloud-based AI service provider. In response to receiving a query, the dispatcher bot selects a particular worker bot to handle the query. The particular worker bot is assigned to a particular AI service provider. An AI adapter associated with the particular AI service provider, generates a query message based on the query. The AI adapter sends the query message to the particular AI service provider and receives a response message. The dialog management system sends a representation of the response message to the particular worker bot, receives an answer for the query from the particular worker bot, and provides the answer for output.

20 Claims, 3 Drawing Sheets

Related U.S. Application Data continuation of application No. 16/199,345, filed on Nov. 26, 2018, now Pat. No. 10,381,006.

(51) Int. Cl.
*G06F 16/332* (2019.01)
*G06N 5/02* (2006.01)
*G06F 16/33* (2019.01)

(56) References Cited

U.S. PATENT DOCUMENTS

| | | | |
|---|---|---|---|
| 10,381,006 B1 | | 8/2019 | Erikksson et al. |
| 10,679,126 B2* | | 6/2020 | Osindero ............... G06N 3/08 |
| 2011/0161314 A1 | | 6/2011 | Chunilal |
| 2012/0191629 A1* | | 7/2012 | Shae .................. G06F 16/332 706/11 |
| 2013/0304758 A1* | | 11/2013 | Gruber ............... G06F 16/9535 707/769 |
| 2014/0236934 A1* | | 8/2014 | Boyle ............... G06F 16/24578 707/723 |
| 2015/0117631 A1* | | 4/2015 | Tuchman ............... H04W 4/021 379/265.09 |
| 2015/0310446 A1 | | 10/2015 | Tuchman et al. |
| 2018/0052664 A1* | | 2/2018 | Zhang ..................... G06F 8/34 |
| 2018/0157681 A1* | | 6/2018 | Yang .................... G06F 16/583 |
| 2018/0165936 A1* | | 6/2018 | Smith ................ G06F 11/3013 |
| 2018/0173808 A1* | | 6/2018 | Sharma .............. G06F 16/9535 |
| 2018/0173999 A1* | | 6/2018 | Renard ................ G06K 9/6256 |
| 2018/0181558 A1* | | 6/2018 | Emery ................... H04L 51/02 |
| 2018/0181656 A1* | | 6/2018 | Proctor ................. H04W 76/45 |
| 2018/0196796 A1* | | 7/2018 | Wu ...................... G06N 5/022 |
| 2018/0225365 A1* | | 8/2018 | Altaf .................. G06F 16/3344 |
| 2018/0349844 A1* | | 12/2018 | Bounasser ......... G06Q 10/0833 |
| 2019/0019160 A1* | | 1/2019 | Champaneria ....... G06F 40/295 |
| 2019/0104093 A1* | | 4/2019 | Lim ..................... H04L 51/04 |
| 2019/0158433 A1* | | 5/2019 | Yun ..................... G10L 15/063 |
| 2020/0168218 A1 | | 5/2020 | Eriksson et al. |

OTHER PUBLICATIONS

Subramaniam et al., "COBOTS—A Cognitive Multi-Bot Conversational Framework for Technical Support Industrial Applications Track," Proc. of the 17th International Conference on Autonomous Agents and Multiagent Systems, Jul. 10-15, 2018, Stockholm, Sweden, 597-604.

* cited by examiner

DIALOG MANAGEMENT SYSTEM FOR USING MULTIPLE ARTIFICIAL INTELLIGENCE SERVICE PROVIDERS

CROSS-REFERENCE TO RELATED APPLICATION

This application is a continuation of U.S. application Ser. No. 16/453,428, filed Jun. 26, 2019, which is a continuation of U.S. application Ser. No. 16/199,345, filed Nov. 26, 2018, now U.S. Pat. No. 10,381,006, issued Aug. 13, 2019. The complete disclosures of all of the above patent applications are hereby incorporated by reference in their entirety for all purposes.

BACKGROUND

A computer-implemented dialog system can engage in dialogues with users. Dialog systems have been particularly helpful in customer service, sales, and marketing, for example, to answer user questions (e.g., over the phone) or direct the users to proper solutions (e.g., by providing a URL address). A dialog system may use an artificial intelligence (AI) service that is capable of natural language processing user conversations. Such a system may include bots (e.g., chatbots) that use the output of the AI service to continue dialogues with the users. For example, a bot may use the output of the AI service to conduct a search and find an answer for a user question.

SUMMARY

Implementations of the present disclosure are directed to dialog management systems capable of utilizing multiple artificial intelligence (AI) service providers. The dialog management system can use different AI service providers for different dialogues with users.

Some implementations perform actions that include receiving, by a channel adapter of a dialog management system, a query, the dialog management system including (i) the channel adaptor, (ii) a dispatcher bot, (iii) multiple worker bots, (iv) multiple AI adapters that are each associated with a different cloud-based AI service provider, and (v) a knowledge retriever; selecting, by the dispatcher bot, a particular worker bot to handle the query, the particular worker bot being assigned to a particular cloud-based AI service provider that is configured to provide a natural language processing of the query; generating, by a particular AI adapter that is associated with the particular cloud-based AI service, a query message based on the query; sending, by the particular AI adapter, the query message to the particular cloud-based AI service provider; receiving, by the particular AI adapter, a response message from the particular cloud-based AI service provider, the response message includes first data that indicates content of the query message; generating, by the particular AI adapter, a representation of the response message that is consumable by the knowledge retriever; sending, by the knowledge retriever, the representation of the response message to the particular worker bot, and in response: receiving, by the knowledge retriever, an answer for the query from the particular worker bot, and forwarding the answer to the channel adapter; and providing, by the channel adapter, the answer for output. Other implementations include corresponding systems, apparatus, and computer programs, configured to perform the actions of the methods, encoded on computer storage devices.

These and other implementations may each optionally include one or more of the following features: dispatcher bot determines the particular worker bot based on a keyword analysis of the query; the dispatcher bot performs speech recognition on the query; actions further include consulting, by the dispatcher bot, a list of cloud-based AI service providers that are indicated as capable of determining content of the query; the dispatcher bot selects a highest ranking AI service provider from among multiple candidate AI service providers that are indicated as capable of determining content of the query; generating query message includes reformatting the query into a format that is capable of being consumed by the particular cloud-based AI service provider; generating the query message includes adding context data that is derived from prior interactions with a user that submitted the query; generating the query message includes adding user profile information; generating the representation of the response message includes reformatting the response message into a standard format that is associated with the knowledge retriever; generating the representation of the response message includes discarding second data that is included in the response but is not used by the particular worker bot for generating the answer; the first data includes information about intent associated with the query; generating the representation of the response message includes discarding second data that is included in the response but is not used by the knowledge-retriever for providing the answer; providing the answer includes providing, for display, a representation of the answer for output to a user that asked the query.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available solutions. Unlike a dialog system that has no flexibility in using different AI service providers, implementations of the present disclosure provide a dialog management system that is capable of utilizing multiple AI service providers, including third-party AI service providers, cloud-based AI service providers, and internal AI service providers. Bots of a dialog system that has no flexibility in using different AI service providers, have to use the AI service provider to which the bots were assigned. Accordingly, a bot continues to use the same AI service provider even if a better AI service provider is available.

Implementations of the present disclosure provide the ability of using multiple AI service providers and switching between them. The present dialog management system can review performance (e.g., efficiency, speed, quality, accuracy, etc.) and/or cost of using different AI service providers and decide which AI service provider to use. Accordingly, the present dialog management system can switch between the AI service providers and add or remove an AI service provider to improve its performance in conducting dialogues with users.

In addition, the present dialog management system can associate different bots to different AI service providers. Accordingly, two bots in the dialog management system can be associated to two different AI service providers. Further, the present dialog management system can select an AI service provider based on data associated with the dialogue such as user profile information of the user engaged with the dialogue, subject matter of the dialogue, time of dialogue, etc. For example, the dialog management system may determine that compared to other AI service providers, a particular AI service provider provides a more accurate service for queries in a particular language. Accordingly, the dialog management system can select the particular AI service provider to support dialogues that are in the particular language, or to support queries submitted by users in a geographical region that speak the particular language.

Methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to dialog management systems that are capable of using multiple AI service providers. A dialog management system can use different AI service providers to support different dialogues with users. The AI service providers can include cloud-based AI service providers, third party AI service providers, or AI service providers internal to the dialog management system. The AI service providers are capable of performing natural language processing on the conversations (or queries) submitted by the users. Examples of AI service providers include, but is not limited to IBM WATSON, GOOGLE DIALOGFLOW, MICROSOFT BOT FRAMEWORK.

In this application, "conversation" and "query" are used interchangeably and include information or questions submitted by users of the dialog management system as part of a dialogue with the system. A user can submit conversations or queries in form of a text, audio, or video file. In response, the dialog management system provides an "answer" or "solution" to the user.

Figure 1:
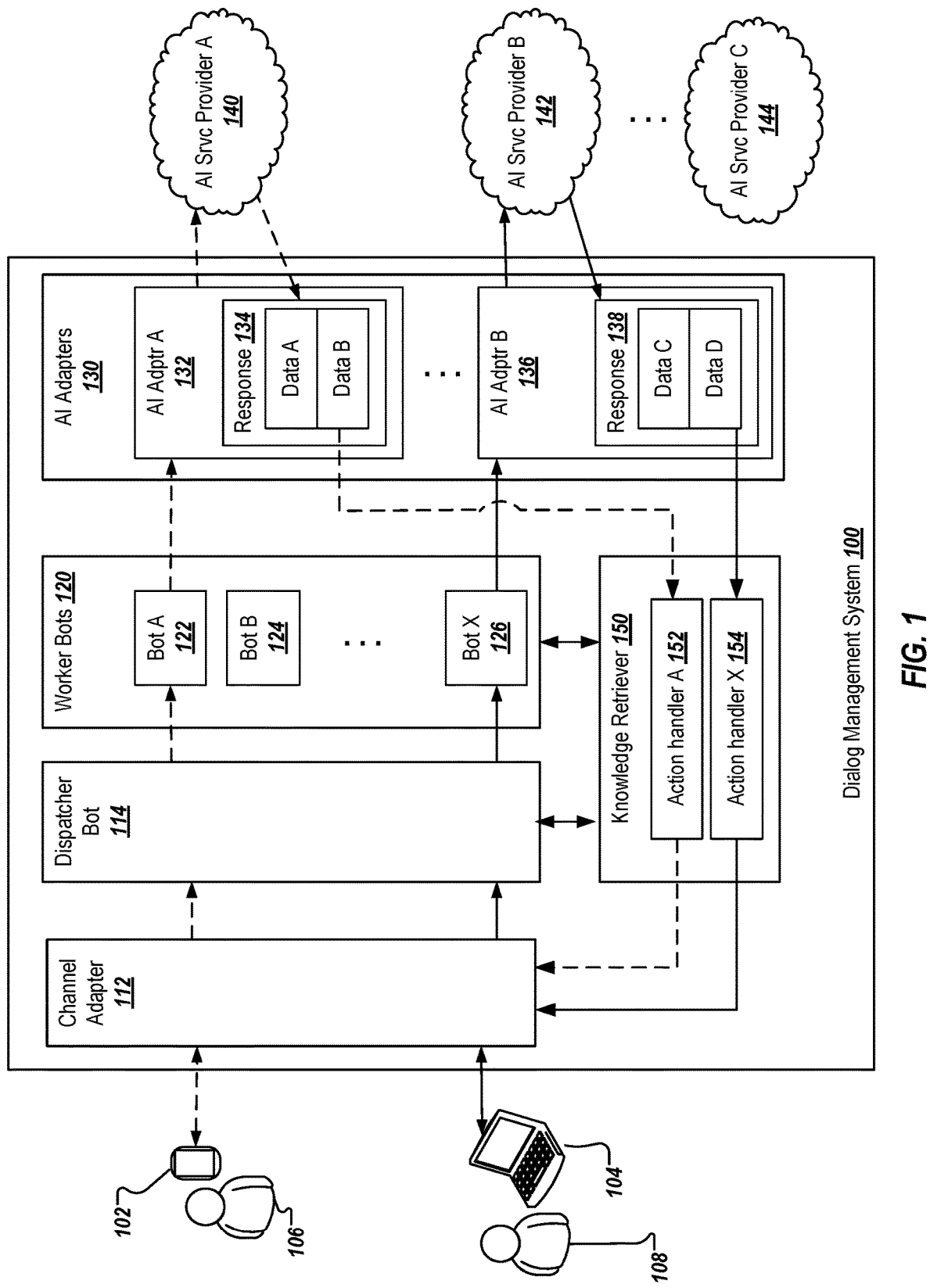
FIG. 1 depicts an example conceptual architecture of a dialog management system in accordance with implementations of the present disclosure.

FIG. 1 depicts an architecture of a dialog management system 100 in accordance with implementations of the present disclosure. The example dialog management system 100 provides one or more answers to the queries received from users (e.g., user 106, 108). The dialog management system 100 routes each query to a particular Artificial Intelligence (AI) service provider based on the content of the query. Accordingly, two queries with different contents may be routed to different AI service providers. For example, the dialog management system 100 can route a query received from the user device 102 to AI service provider A 140 and a query received from the user device 104 to AI service provider B 142.

The dialog management system 100 includes a channel adapter 112, a dispatcher bot 114, a group of worker bots 120, a group of AI adaptors 130, and a knowledge retriever 150 module. The dialog management system receives queries from user devices through channel adapter 112. The channel adapter 112 forwards the queries to the dispatcher bot 114. For each query, the dispatcher bot (which is also referred to by this specification as a "choreographer") decides which worker bot in the group of worker bots 120 should handle the query.

Each worker bot is associated with a particular AI service provider. A worker bot communicates with a respective AI service provider through an AI adapter associated with the respective AI service provider. An AI service provider receives a query message from a respective AI adapter and provides a response message to the same AI adapter. The AI adapter sends the response message (or part of the response message) to the knowledge retriever 150 (which is also referred to by this specification as a "conversation flow manager").

The knowledge retriever communicates with the worker bot that was selected by the dispatcher bot, to provide a solution to the query. The knowledge retriever 150 communicates the solution to the channel adapter 112 to provide the solution to the user who submitted the query.

The group of worker bots 120 includes worker bot A 122, worker bot B 124, and worker bot X 126. The group of worker bots 120 may include more or fewer worker bots than is illustrated in FIG. 1. Each worker bot can be associated with one or more particular tasks, functions, or subject matters. For example, one worker bot may be associated with billing, another with accounting, another with medical issues, etc.

Implementations of the present disclosure are described in further detail herein with reference to an example context. The example context includes receiving a first query from a user account associated with user 106, and a second query from a user account associated with user 108. The first query inquires how to pay a cable bill online, and the second query inquires the best brands for a particular medicine. It is contemplated, however, that implementations of the present disclosure can be realized with any appropriate context.

The dispatcher bot 114 selects a worker bot to handle a query depending on how relevant the query is to the function, tasks, and/or subject matters that the worker bot can handle. For example, the dispatcher bot 114 may determine that a query received from the user device 102 is about paying a bill and the query received from the user device 104 is about taking a medicine. The dispatcher bot checks which worker bots in the group of worker bots 120 are related to billing and which worker bots are related to medical issue. The dispatcher bot can make such a determination by using a look up table that has a record of the worker bots and the subject matters that each worker bot can handle. The dispatcher bot 114 can determine that worker bot A 122 is associated with billing questions and worker bot X 126 is associated with medical issues. Accordingly, the dispatcher bot forwards the first query to the worker bot A 122, and the second query to the worker bot X 126.

As noted above, each worker bot is associated with an AI service provider. For example, the worker bot A 122 is associated with the AI service provider A 140, and the worker bot X 126 is associated with the AI service provider B 142. Two worker bots can be associated with the same AI service providers or with different service providers. For example, the AI service provider A may be associated with both worker bot A 122 and worker bot B 124.

A worker bot communicates with a respective AI service provider through an AI adapter. The AI adapter generates a query message for a query message received from the worker bot. Generating the query message can include reformatting the query into a format that is capable of being consumed by the respective AI service provider. For example, the AI adapter A 132 generates a first query message consumable by the AI service provider A 140 for the first query received from the worker bot 122. The AI adapter B 136 generates a second query message consumable by the AI service provider B 142 for the second query received from the worker bot X 126.

In some implementations, the AI adapter generates a query message by adding context data to the query. The context data can include user profile information and/or data derived from prior interactions with the user who submitted the query. For example, the AI adapter A 132 may determine that in a prior dialogue user 106 had asked about fictional cable company CABLECO, and add this information to the query message that is to be sent to the AI service provider A 140.

AI service provider that receives a query message from an AI adapter processes the query message and provides a response to the AI adapter. For example, the AI service provider A 140 receives the first query message from the AI adapter A 132 and provides a response message 134 to the AI adapter A 132. The AI service provider B 142 receives the second query message from the AI adapter B 136 and provides a response message 138 to the AI adapter B 136.

AI service providers can provide response messages by natural language processing (NLP) the query messages. A response message can include a variety of information such as content of the query message, an intent behind the query message, possible answers for the query message, entities that are listed in the query message, entities that can provide an answer to the query message, etc.

For example, the response message 134 includes data A and data B. Data B can indicate the intent behind the first query message, and data A can indicate other information. For example, data B may indicate that the first message query inquires how to pay a cable bill from a particular cable company online, and data A may include information such as customer service contact information for the cable company, information of alternative cable companies, regions that are supported by the cable company, etc. Similarly, the response message 138 includes data C and data D, where data D indicates the intent behind the second query message, and data C includes other information. For example, data D may indicate that the second message query inquires top ranked brands for particular medicine, and data C may indicate information on side effects of the medicine, proper age for taking the medicine, substitutes for the medicine, etc.

An AI adapter that receives a response message from a respective AI service provider prepares the response message for being processed by the knowledge retriever 150 and/or by worker bots selected by the dispatcher bot. The preparation process can include a filtering process to discard a portion of the response message that is not used by the knowledge retriever and/or the worker bots in generating an answer to query. The filtering results in processing of less data and reduces resources and time required for data processing at the knowledge retriever and/or worker bots.

For example, the AI adapter can discard data other than intent-related information on the response message. For example, the AI adapter 132 can be configured to remove data A from the response message 134 and send only data B (which indicates the intent behind the first query message) to the knowledge retriever 150. Similarly, the AI adapter B 136 can remove data C from the response message 138 and send only data D to the knowledge retriever 150.

The preparation process of the response message can include generating a representation of the response message that is consumable by the knowledge retriever and/or by the respective worker bots. Generating the representation can include reformatting the response message into a format (e.g., a standard format) associated with the knowledge retriever and/or the respective worker bots. Generating the representation can be performed before or after performing the filtering process. For example, the AI adapter A 132 generates a representation of data B (of the response message 134) that is consumable by the knowledge retriever 150. Such representation is referred to as data B' herein. The AI adapter B 136 generates a representation of data D (of the response message 138) that is consumable by the knowledge retriever 150. Such representation is referred to as data D' herein.

Once the preparation process is completed, the AI adapter sends a package message associated with the query, to the knowledge retriever. The package message can include identification information of the worker bot that was selected by the dispatcher bot to handle the query, and a query message as prepared by the AI adapter. The package message can also include an identification information of the AI adapter or a respective AI service provider, and/or the query (e.g., as received from the user device).

For example, the AI adapter A 132 sends a first package message that includes identification information of the worker bot A 122, data B' (associated with the response message 134), and identification information of the AI adapter A 132 to the knowledge retriever 150. The AI adapter B 136 sends a second package message that includes an identification information of the worker bot X 126, the second query submitted by the user device 104, and data D' (associated with the response message 138) to the knowledge retriever 150.

In response to receiving a package message from an AI adapter, the knowledge retriever 150 communicates with the worker bot that was selected by the dispatcher bot for handling the query, to provide an answer or solution to the query. For example, the knowledge retriever 150 receives the first package message and sends the data B' along with an indicator that refers data B' to the first query, to the worker bot A 122. The worker bot A 122 reviews the data B' and the first query and generates a first answer for the first query. The knowledge retriever 150 receives the second package message and sends data D' and the second query to the worker bot X 126. The worker bot X 126 reviews data D' and the second query and generates a second answer for the second query.

A handling worker bot (i.e., a worker bot that is selected by the dispatcher bot to handle a query) uses the intent provided by a respective AI service provider to generate an answer to the query. For example, as noted above, the data B' includes information indicating that the first query (submitted by the user device 102) was a question on how to pay a cable bill from a particular cable company online. In response, the worker bot A 122 can provide one or more websites (or addresses to the websites) where such payment can be made. As another example, the data D' includes information indicating that the second query (submitted by the user device 104) inquires the top ranked brands for a particular medicine. In response, the worker bot X 126 can provide one or more brands that are considered as the highest ranked brands for the particular medicine. The worker bot A or X can search online or use a database for generating such answers.

The handling worker bot returns the answer to the knowledge retriever and the knowledge retriever provides the answer to the channel adapter to be delivered to the user submitted the query. Accordingly, the worker bot A 122 returns the first answer and the worker bot X 126 returns the second answer to the knowledge retriever 150. The knowledge retriever 150 provides the first and the second answers to the channel adapter 112.

The channel adapter 112 delivers a representation of the first answer to the user device 102, and a representation of the second answer to the user device 104 through their respective channels of communication. For example, the channel adapter 112 checks type of user device 102 and determines that the user device 102 is a mobile computing device, and checks type of the user device 104 and determines that the user device 104 is a personal computer. The channel adapter sends a representation of the first answer that is proper for being delivered on a mobile computing device to the user device 102, and a representation of the second answer that is proper for being delivered on a personal computer to the user device 104. The representation can be displayed, be played (e.g., as audio or video), or be used as part of a software program executed on the user device.

In some implementations, the knowledge retriever associates different action handlers to different queries, or to response messages received from different AI adapters. For example, the knowledge retriever 150 includes action handler A 152 that can be associated with the first query submitted by the user device 102, and action handler X 154 that can be associated with the second query submitted by the user device 104.

In some implementations, the knowledge retriever performs additional processes on the package message to determine an action handler associated with a query. For example, in response to receiving the second package message from the AI adapter B 136, the knowledge retriever 150 reviews a list of used cases that the worker bot X 126 handles. If the knowledge retriever 150 determines that no other used case handled by the worker bot X 126 is relevant to the data D', the knowledge retriever 150 assigns a new action handler (e.g., the action handler X 154) to the second query. If the knowledge retriever 150 determines that a particular used case is relevant to the data D' (e.g., has an intent that is relevant to the intent included in the data D', is related to a query submitted by user 108 or the user device 104, was submitted within a particular period of time before the submission of the second query, etc.), the knowledge retriever associates the second query to an action handler (e.g., action handler C, not shown) that was assigned to the particular used case.

As noted above, the dispatcher bot is responsible for selecting a worker bot to handle a query. The dispatcher bot makes such selections based on content of the query and/or a history associated with the query. The dispatcher bot can determine the subject matter of the query based on a keyword analysis of the query. For example, the dispatcher bot may perform a natural language classification on the query, or may communicate with an AI service provider that can provide a natural language classification. Alternatively, as explained in more details below, the dispatcher bot can select a default worker bot for handling one or more new queries.

The dispatcher bot can use a history associated with a query to determine the subject matter of the query. For example, when a query is part of a series of communications with a particular user, the dispatcher bot may forward the query to the same worker bot that handled prior queries in the series of communications. Two queries can be part of the same series of communications if they are e.g., submitted by the same user (or network of users), submitted within a predetermined period of time, and/or less than a predetermined number of queries were submitted in between the two queries.

In case that the determined intent of a query by an AI service provider is beyond the handling capability of the worker bot that the dispatcher bot selected, the query can be reassigned to another worker bot that is capable of handling the intent. For example, the dispatcher bot 114 may receive a third query from the user device 104 and determine that the third query is associated with the second query (e.g., was submitted within five minutes after receiving the second query or within two minutes after providing an answer to the second query). Accordingly, the dispatcher bot 114 may assign the third query to bot X 126 as well. The AI service provider 142 may determine that the intent behind the third query is different from the one in the second query. For example, the third query may inquires an account balance of user 108's checking account, while the second query was about a medical issue.

When the intent is forwarded to the bot X 126, the bot X 126 can review the intent of the third query and send a message to the knowledge retriever indicating that the intent is not within the subject matter that the bot X can handle. Alternatively, the knowledge retriever 150 can check the subject matters associated with worker bot X and confirm that the worker bot X is not a proper bot to answer the third query, before forwarding the intent to the worker bot X.

In response to determining that the worker bot X cannot answer the third query, the knowledge retriever communicates with the dispatcher bot and requests identification information of a worker bot that is capable of handling the third query. The dispatcher bot identifies, for example, worker bot B 124 as a worker bot that can handle accounting queries and provides information of the worker bot B 124 to the knowledge retriever. In response, the knowledge retriever sends the third query, the respective intent, and other relevant information received from the AI adapter B 136 (e.g., name of the bank that is to be checked for the account balance) to the worker bot B 124.

In some implementations, when the dispatcher bot 114 does not find a new query as being related to another query previously received, or when the dispatcher bot is not aware of the content of the new query, the dispatcher bot sends the query to a default worker bot. The dialog management system 100 can be configured so that worker bots that are associated with particular AI service providers be set as default worker bots. The particular AI service provider can be selected based on business, economic, or performance incentives. For example, the particular AI service provider may provide a more accurate analysis of query messages, may costs lower, or may be faster than other AI service providers.

In some implementations, the dispatcher bot makes the worker bot selection for a query based on a list of AI service providers that are determined as capable of processing the query. Each of the AI service providers can be associated with a ranking. The ranking can be based on a general performance of the respective AI service provider, or can be subject matter related. Since the present dialog management system can select AI service providers that the system can use for each subject matter, the dialog management system can provide a faster, more accurate, and/or less expensive services than a dialog system that uses fixed AI service providers.

For example, both AI service providers A and B may be able to process medical related questions, but AI service provider B may be faster, cost lower, or provide more accurate response for medical issues than the AI service provider A. Consequently, the dispatcher bot selects AI service provider B for medical issues and selects a worker bot associated with the AI service provider B to handle queries directed to medical issues.

In some cases, the dispatcher bot 114 may determine that multiple worker bots are capable of handling a particular query. In such situations, the dispatcher bot can review rankings of the AI service providers associated with the candidate worker bots and select the highest ranking AI service provider for processing the particular query. In case that the highest ranking worker bot is associated with only one candidate worker bot, the dispatcher bot selects this one candidate worker bot to handle the particular query. In case that the highest ranking worker bot is associated with more than one candidate worker bots, the dispatcher bot can select one of the candidate worker bots randomly, based on past performances of the candidate worker bots, and/or based on a current work load on each of the candidate worker bots.

In some implementations, the dialog management system 100 can switch between AI service providers based on cost, accuracy, and/or speed of the service providers. For example, the AI service provider A may change its services or increase the cost of using it. In response, the dialog management system 100 compares the services that the system can receive from the AI service provider A to the services that the system could potentially receive from other AI service providers had the dialog management system replaced the AI service provider A with the other AI service providers.

The dialog management system 100 may determine that it is more beneficial to (at least partly) replace the AI service provider A 140 with the AI service provider C 144. Consequently, the dialog management system 100 reassigns one or more worker bots that were assigned to the AI service provider A, to AI service provider C. For example, the dialog management system 100 can reassign worker bot A 122 to the AI service provider C, while keeping the association of worker bot B 124 with the AI service provider A.

Accordingly, compared to a dialog system that uses fixed AI service providers, the present dialog management system can adjust itself to keep using one or more highest ranked AI service providers. Thus, even if service of one or more AI service providers changes, the dialog management system can update itself by adjusting assignment of the worker bots to high ranked AI service providers. Such configuration provides the dialog management system a more efficient performance as compared to dialog systems that use fixed AI service providers.

Figure 2:
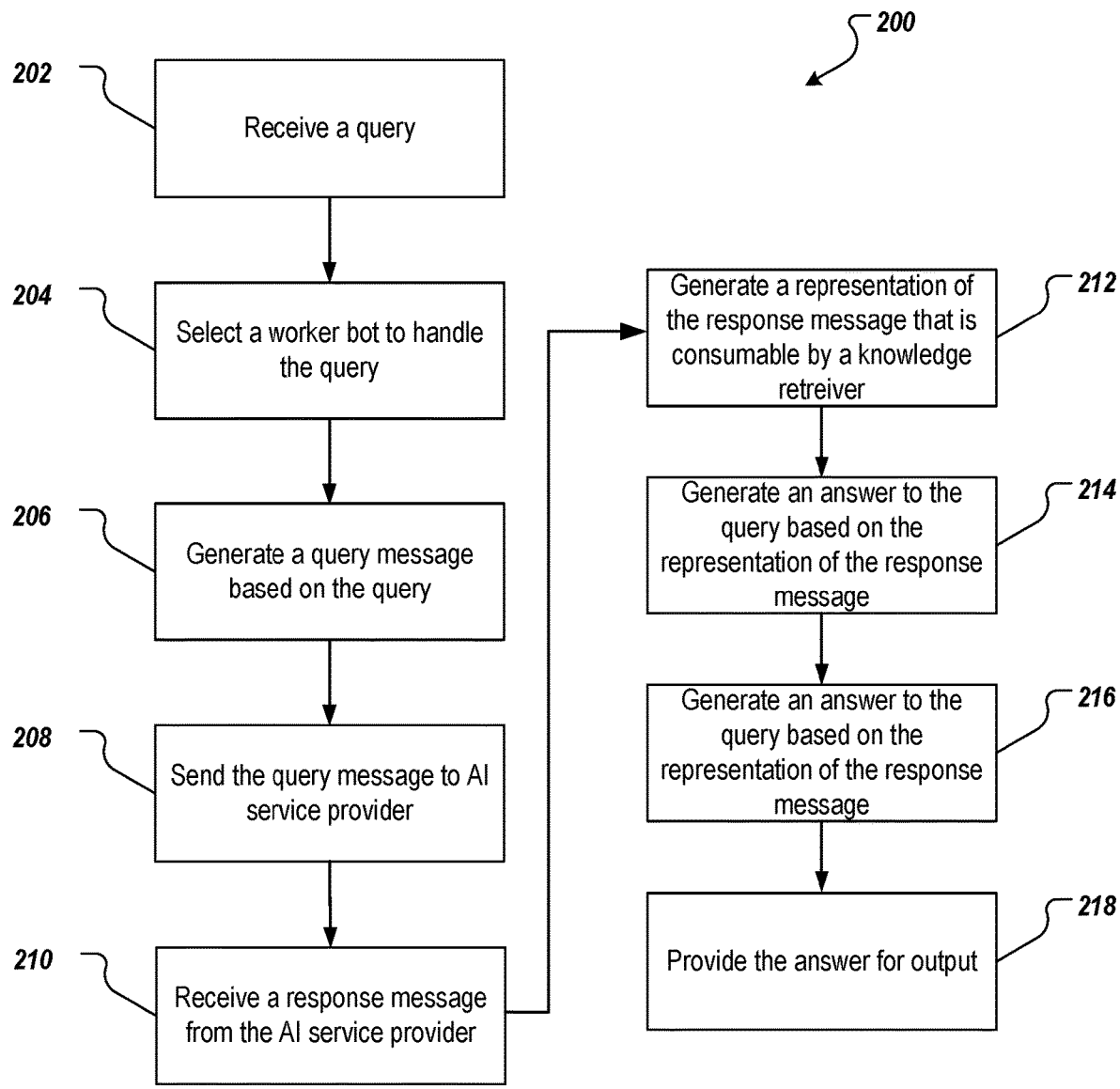
FIG. 2 depicts an example process that can be executed in accordance with implementations of the present disclosure.

FIG. 2 depicts an example process 200 that can be executed in accordance with implementations of the present disclosure. In some implementations, the example process 200 may be performed using one or more computer-executable programs executed using one or more computing devices. The process 200 is performed by a dialog management system, for example, the dialog management system 100.

A query is received (202). For example, the query can be submitted by a user (e.g. user 106) through a user computing device (e.g., user device 102). The request can be received by a channel adapter (e.g., channel adapter 112) of the dialog management system.

A worker bot is determined to handle the query (204). For example, a dispatcher bot (e.g., dispatcher bot 114) can select a worker bot (e.g., worker bot A 122) to handle the query. The dispatcher bot can select the worker bot based on a history associated with the query. The history can include information on last communications of the dialog management system with the same user. The selected worker bot is associated with a particular AI service provider. The particular service provider can be a cloud-based service provider, or an internal module and is capable of NLP of the query.

A query message is generated based on the query (206). The query message can be generated by an AI adapter associated with the particular AI service provider. For example, the worker bot A 122 is associated with the AI service provider A 140 and the AI adapter A 132 generates a query message consumable by the AI service provider A 140.

The query message is sent to the particular AI service provider (208). For example, the AI adapter A 132 can send the query message to the AI service provider A 140.

A response message is received from the particular AI service provider (210). The particular AI service provider processes the query message received from the AI adapter and provides the response message to the AI adapter. The response message can include information about content of the query message such as the intent behind the query and the entities included as part of the query. The response message can also include information other than the content of the query message such as alternative entities that can provide a solution to the query.

A representation of the response message is generated (212). The representation of the response message is consumable by handling parts of the dialog management system that are responsible for providing an answer to the query (e.g., a knowledge retriever, one or more worker bots). The AI adapter can generate the representation by reformatting the response message into a format that is associated with the handling parts of the dialog management system. In some implementations, the AI adapter filters a portion of the response message by discarding information other than the information that is used by the handling parts. For example, the AI adapter can keep information related to the content of the query message and discard the rest of the response message. The AI adapter provides the representation of the response message (or representation of the filtered response message) to the knowledge retriever.

An answer (or a solution) to the query is generated (216). The answer is generated based on the representation of the response message provided by the AI provider. The knowledge retriever can forward the representation (or a portion of the representation that indicates the content of the query message) to the worker bot selected at 204 and receive an answer from the worker bot.

The answer is provided for output (218). For example, the knowledge retriever 150 can forward the answer to the channel adapter 112, and the channel adapter can provide the answer to the user device from which the query was received at 202. The answer can be displayed, played as audio, or be used as part of a software program executed on the user device 102.

Figure 3:
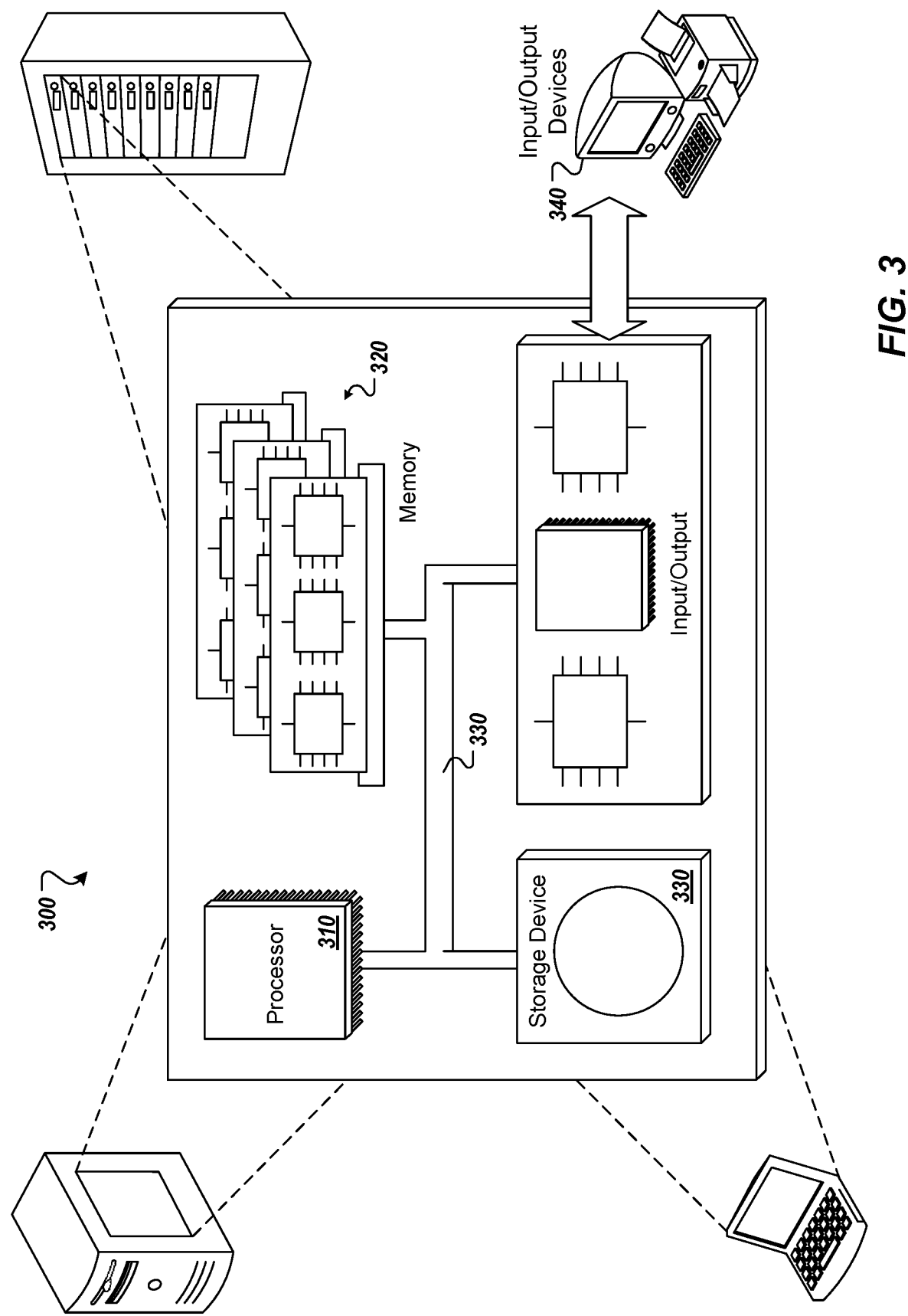
FIG. 3 depicts a schematic diagram of an example computing system according to the implementations of the present disclosure.

FIG. 3 depicts a schematic diagram of an example computing system 300 in accordance with implementations of the present disclosure. The system 300 may be used to perform the operations described with regard to one or more implementations of the present disclosure. For example, the system 300 may be included in any or all of the server components, or other computing device(s), discussed herein. The system 300 may include one or more processors 310, one or more memories 320, one or more storage devices 330, and one or more input/output (I/O) devices 340. The components 310, 320, 330, 340 may be interconnected using a system bus 350.

The processor 310 may be configured to execute instructions within the system 300. The processor 310 may include a single-threaded processor or a multi-threaded processor. The processor 310 may be configured to execute or otherwise process instructions stored in one or both of the memory 320 or the storage device 330. Execution of the instruction(s) may cause graphical information to be displayed or otherwise presented via a user interface on the I/O device 340.

The memory 320 may store information within the system 300. In some implementations, the memory 320 is a computer-readable medium. In some implementations, the memory 320 may include one or more volatile memory units. In some implementations, the memory 320 may include one or more non-volatile memory units.

The storage device 330 may be configured to provide mass storage for the system 300. In some implementations, the storage device 330 is a computer-readable medium. The storage device 330 may include a floppy disk device, a hard disk device, an optical disk device, a tape device, or other type of storage device. The I/O device 340 may provide I/O operations for the system 300. In some implementations, the I/O device 340 may include a keyboard, a pointing device, or other devices for data input. In some implementations, the I/O device 340 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
   receiving a query;
   dynamically selecting a particular worker bot to initially handle the query based at least on (i) data that associates the particular worker bot with a subject matter of the query, and (ii) historical speed data or monetary cost data associated with processing past queries by a particular cloud-based, third party AI service provider that is configured to provide a natural language processing of the query and that is assigned to the particular worker bot;
   generating a query message based on the query;
   sending the query message to the particular cloud-based, third party AI service provider;
   receiving a response message from the particular cloud-based, third party AI service provider, the response message includes first data that indicates content of the query message;
   generating a representation of the response message that is consumable by a knowledge retriever; and
   sending the representation of the response message to the particular worker bot, and in response:
      receiving the answer for the query from the particular worker bot, and
      forwarding the answer to the channel adapter; and
   providing, by the channel adapter, the answer for output.

2. The method of claim 1, wherein a dispatcher bot determines the particular worker bot based on a keyword analysis of the query.

3. The method of claim 2, wherein the dispatcher bot performs speech recognition on the query.

4. The method of claim 1, comprising consulting, by a dispatcher bot, a list of cloud-based AI service providers that are indicated as capable of determining content of the query.

5. The method of claim 1, wherein a dispatcher bot selects a highest ranking AI service provider from among multiple candidate AI service providers that are indicated as capable of determining content of the query.

6. The method of claim 1, wherein generating query message comprises reformatting the query into a format that is capable of being consumed by the particular cloud-based AI service provider.

7. The method of claim 1, wherein generating the query message comprises adding context data that is derived from prior interactions with a user that submitted the query.

8. The method of claim 1, wherein generating the query message comprises adding user profile information.

9. The method of claim 1, wherein generating the representation of the response message comprises reformatting the response message into a standard format that is associated with the knowledge retriever.

10. The method of claim 1, wherein the first data includes information about intent associated with the query.

11. The method of claim 1, wherein providing the answer comprises providing, for display, a representation of the answer for output to a user that asked the query.

12. A non-transitory computer-readable storage medium coupled to one or more processors and having instructions stored thereon which, when executed by the one or more processors, cause the one or more processors to perform operations, the operations comprising:
   receiving a query;
   dynamically selecting a particular worker bot to initially handle the query based at least on (i) data that associates the particular worker bot with a subject matter of the query, and (ii) historical speed data or monetary cost data associated with processing past queries by a particular cloud-based, third party AI service provider that is configured to provide a natural language processing of the query and that is assigned to the particular worker bot;
   generating a query message based on the query;
   sending the query message to the particular cloud-based, third party AI service provider;
   receiving a response message from the particular cloud-based, third party AI service provider, the response message includes first data that indicates content of the query message;
   generating a representation of the response message that is consumable by a knowledge retriever; and
   sending the representation of the response message to the particular worker bot, and in response:
      receiving the answer for the query from the particular worker bot, and
      forwarding the answer to the channel adapter; and
   providing, by the channel adapter, the answer for output.

13. The medium of claim 12, wherein a dispatcher bot determines the particular worker bot based on a keyword analysis of the query.

14. The medium of claim 13, wherein the dispatcher bot performs speech recognition on the query.

15. The medium of claim 12, comprising consulting, by a dispatcher bot, a list of cloud-based AI service providers that are indicated as capable of determining content of the query.

16. The medium of claim 12, wherein a dispatcher bot selects a highest ranking AI service provider from among multiple candidate AI service providers that are indicated as capable of determining content of the query.

17. The medium of claim 12, wherein generating query message comprises reformatting the query into a format that is capable of being consumed by the particular cloud-based AI service provider.

18. The medium of claim 12, wherein generating the query message comprises adding context data that is derived from prior interactions with a user that submitted the query.

19. The medium of claim 12, wherein generating the query message comprises adding user profile information.

20. A system comprising:
   a computing device; and
   a computer-readable storage device coupled to the computing device and having instructions stored thereon which, when executed by the computing device, cause the computing device to perform operations, the operations comprising:
   receiving a query;
   dynamically selecting a particular worker bot to initially handle the query based at least on (i) data that associates the particular worker bot with a subject matter of the query, and (ii) historical speed data or monetary cost data associated with processing past queries by a particular cloud-based, third party AI service provider that is configured to provide a natural language processing of the query and that is assigned to the particular worker bot;
   generating a query message based on the query;
   sending the query message to the particular cloud-based, third party AI service provider;
   receiving a response message from the particular cloud-based, third party AI service provider, the response message includes first data that indicates content of the query message;
   generating a representation of the response message that is consumable by a knowledge retriever; and sending the representation of the response message to the particular worker bot, and in response:
receiving the answer for the query from the particular worker bot, and
forwarding the answer to the channel adapter; and
providing, by the channel adapter, the answer for output.

\* \* \* \* \*

UNITED STATES PATENT AND TRADEMARK OFFICE
CERTIFICATE OF CORRECTION

| | | |
|---|---|---|
| PATENT NO. | : 11,423,901 B2 | Page 1 of 1 |
| APPLICATION NO. | : 16/929898 | |
| DATED | : August 23, 2022 | |
| INVENTOR(S) | : Eriksson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 203 days.

Signed and Sealed this
Twenty-fifth Day of February, 2025

Coke Morgan Stewart
*Acting Director of the United States Patent and Trademark Office*